United States Patent
Kim et al.

(10) Patent No.: US 7,672,254 B2
(45) Date of Patent: Mar. 2, 2010

(54) APPARATUS AND METHOD FOR PROVIDING FRAME BRIDGE OF WIRELESS LOCAL AREA NETWORK

(75) Inventors: Yun-Joo Kim, Daejeon (KR); Sok-Kyu Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 996 days.

(21) Appl. No.: 11/138,197

(22) Filed: May 25, 2005

(65) Prior Publication Data
US 2006/0029028 A1    Feb. 9, 2006

(30) Foreign Application Priority Data
Aug. 4, 2004    (KR) ...................... 10-2004-0061389

(51) Int. Cl.
H04L 12/28    (2006.01)
(52) U.S. Cl. ..................................... 370/256
(58) Field of Classification Search ................ 370/328, 370/329, 256
See application file for complete search history.

(56) References Cited

U.S. PATENT DOCUMENTS

| | | | | |
|---|---|---|---|---|
| 6,031,863 A * | 2/2000 | Jusa et al. | ................... | 375/132 |
| 6,345,043 B1 | 2/2002 | Hsu | | |
| 6,728,514 B2 | 4/2004 | Bandeira et al. | | |
| 6,751,248 B1 | 6/2004 | Tan | | |
| 7,126,926 B1 * | 10/2006 | Bjorklund et al. | ........... | 370/328 |
| 2002/0123276 A1* | 9/2002 | Peetz | ......................... | 439/894 |
| 2002/0188723 A1* | 12/2002 | Choi et al. | ................. | 709/225 |
| 2005/0078624 A1* | 4/2005 | Shu et al. | .................... | 370/328 |
| 2006/0215619 A1* | 9/2006 | Peetz et al. | ................. | 370/338 |

FOREIGN PATENT DOCUMENTS

| KR | 10-2001-0049004 | 6/2001 |
|---|---|---|
| KR | 10-2002-0067638 | 8/2002 |
| KR | 10-2003-0035227 | 5/2003 |

(Continued)

OTHER PUBLICATIONS

Kim et. al "System for packet bridging between access points of wireless LAN and method thereof, its program storingrecording medium", Publication Date Jun. 26, 2004, 10-2004-0055083 (English Version of Korean Reference).*

(Continued)

Primary Examiner—Derrick W Ferris
Assistant Examiner—Omar Ghowrwal
(74) Attorney, Agent, or Firm—Blakely, Sokoloff, Taylor & Zafman

(57) ABSTRACT

The present invention relates to a wireless local area network (WLAN). In the present invention, an access point transmits and receives a probe frame including identity numbers of each access point with a near access point, determines a master access point, and establishes a connection with a near access point through a first radio channel. The master access point transmits a beacon frame, including time information, to a station through a second radio channel, and establishes a connection with the station. The master access point relays a wired internet service received from internet network to the station. Thereafter the master access point switches the connection to the first radio channel and transmits a data frame to the near access point connected with a target station.

12 Claims, 6 Drawing Sheets

FOREIGN PATENT DOCUMENTS

KR     1020040055083 A   *   6/2004

OTHER PUBLICATIONS

Kim et. al "System for packet bridging between access points of wireless LAN and method thereof, its program storing recording medium", Publication Date Jun. 26, 2004, 10-2004-0055083 (Abstract of Korean Reference).*

5th World Wireless Congress, May 25-28, 2004, 9 pages.

IEEE VTS 50th , vol. 3, Frame transfer protocol with shortcut between wireless bridges, Vehicular Technology Conference, 1999. VTC 1999-Fall, p. 1705-1709.

* cited by examiner

APPARATUS AND METHOD FOR PROVIDING FRAME BRIDGE OF WIRELESS LOCAL AREA NETWORK

CROSS REFERENCE TO RELATED APPLICATION

This application claims priority to and the benefit of Korean Patent Application No. 10-2004-0061389, filed on Aug. 4, 2004, which is hereby incorporated by reference for all purposes as fully set forth herein.

BACKGROUND OF THE INVENTION

1. Field of the Invention

Generally, the present invention relates to a wireless local area network (WLAN), more particularly to an apparatus and a method for providing a frame bridge of an access point.

2. Discussion of the Related Art

Generally, a wireless local area network (WLAN) includes radio devices functioning as mobile stations and access points functioning as connectors to the stations.

To be properly applied to a wireless medium, each element forms a WLAN through a medium access control (MAC) protocol defined in IEEE (Institute of Electrical and Electronics Engineers) 802.11 and a wireless network interface card (NIC) supporting a physical layer standard. An exemplary diagram for the above WLAN is shown in FIG. 1.

As shown in FIG. 1, a WLAN includes access points 4 and 5 and wireless stations STA 6, 7, and 8 connected with the access points. The access points 4 and 5 and the wireless stations 6, 7, and 8 construct a mutually connected structure in accordance with the MAC protocol standard and the physical layer standard defined in IEEE 802.11.

Each access point 4, and 5 relays a wired Internet service received from the Internet 1 to the wireless stations 6, 7, and 8 through a gateway 2 that is connected with a wired medium 3. Herein, the access point 4 functions as a bridge which relays a frame to a non directly connected wireless station 8 through the near access point 5 which is linked to the wired medium 3.

The access point in the WLAN of the above mentioned structure has generally the same function as a station. The access point provides the link service between the WLAN and a wired LAN so that each station may access a distribution system. Therefore the access point includes at least one wired LAN and at least one WLAN.

A frame bridge of the access point is to identify a MAC address of a is station and to transmit a frame to be relayed to the predetermined station. The access point provides the link service between a WLAN and a wired LAN by this frame bridge.

However, the frame bridge of the access point is available when at least one wired LAN is used or when a radio basic service set (BSS) is not supported.

In detail, it is difficult for an access point having one NIC (Network interface card) to operate its own wireless BSS and provide a wireless frame bridge with a near access point simultaneously through different channels.

The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

SUMMARY OF THE INVENTION

The present invention has been made in an effort to provide an apparatus and a method for providing a frame bridge of a wireless local area network.

The advantages of the present invention are to provide a frame bridge through a radio link, and also to provide a radio BSS service by using a wireless network interface card (NIC), and a wireless frame bridge with neighbor access points supporting the MAC standard of IEEE 802.11.

According to an exemplary embodiment of the present invention, an apparatus for providing a frame bridge in a WLAN, which provides a wired Internet service received from the Internet through a gateway, includes an access point (AP) initializer, an station (STA) initializer, a frame bridge provider, and a time flow checker.

Herein, the AP initializer establishes connections with all near access points through a first radio channel when a current access point transmits and receives a probe frame including identity numbers of each access point to/from near access points, and is selected as a master access point.

The STA initializer broadcasts a beacon frame, including time information, to a station through a second radio channel and establishes a connection to the station, after a frame transmission with the near access point is suspended for a predetermined time.

The frame bridge provider provides the wired internet service received from the Internet to the station through the establishment second radio channel and transmits a data frame to the near access point connected with a target station by switching channel to the first radio channel.

The time flow checker periodically checks whether the present time is in a period for a wireless connection establishment with the near access point or with the station, or is in a period for providing a data frame to the near access point or to the station, and controls switching of the radio channel according to the above checking result.

In a further embodiment, the apparatus includes an AP initializer, an STA initializer, a frame bridge provider, and a time flow checker.

The AP initializer establishes a connection with the master access point through a first radio channel, when a current access point transmits and receives a probe frame including identity numbers of each access point with near access points, and is selected as a near access point.

The STA initializer transmits the beacon frame and establishes a connection with at least one station through a second radio channel.

The frame bridge provider relays the data frame received from a master access point to a station through the second radio channel.

The time flow checker periodically checks whether the present time is in a period for a wireless connection establishment with the master access point or with the station, or is in a period for providing a data frame to the master access point or to the station, and controls switching of the radio channel according to the above checking result.

In another further embodiment, the AP initializer includes a near AP initializer, a synchronizer, and a wireless network establisher.

Herein, the near AP initializer determines a master access point and a near access point by using a probe frame received from the near access point.

The synchronizer transmits a beacon frame to the near access point and controls the near access point to synchronize with the master access point.

The wireless network establisher establishes a connection with the near access point through the first radio channel when the synchronized near access point establishes the connection for the first radio channel.

In a still further embodiment, the near access point synchronizes with the master access point by using at least one of delivery traffic indication message (DTIM), traffic indication map (TIM), and TIM interval in the beacon frame.

In a still further embodiment, the STA initializer broadcasts the beacon frame to a station according to the MAC protocol defined in IEEE 802.11.

In a still further embodiment, the frame bridge provider transmits and receives a data frame with all the near access points through the first radio channel after transmitting a bridge packet data unit (BPDU), including bridge information of the near access points, to all the near access points.

According to an exemplary embodiment of the present invention, a method for providing a frame bridge in a WLAN, which provides wired Internet service received from an Internet through a gateway, includes the below steps a), b), c), d), and e).

Step a) includes transmitting and receiving a probe frame including identity numbers of each access point to/from more than one near access point, and determining a master access point and a near access point respectively.

Step b) includes establishing a connection with a near access point through a first radio channel after controlling the master access point to transmit a beacon frame, including time information, to the near access point through the first radio channel and to synchronize with the near access point.

Step c) includes the near access point broadcasting a beacon frame to a station through a second radio channel and establishing a connection with the station after the end of the connection establishment with the master access point.

Step d) includes relaying a data frame to the near access point linked with a target station after the master access point switches the connection to the first radio channel and broadcasts a BPDU including bridge information of all the near access points.

Step e) includes the near access point transmitting a beacon frame to the station and synchronizing with the master access point after switching the connection to the second radio channel.

In a further embodiment, the method further includes checking periodically whether the present time is in a period for a wireless connection establishment with the near access point or with the station, or is in a period for providing a data frame to the near access point or to the station, and controlling radio channel switching according to the above checking result.

In another further embodiment, step b) includes checking whether connection establishment with all the near access points is completed, and transmitting a wireless bridge end message to the near access points when the above connection establishment is completed.

In a still further embodiment step c) includes the near access point synchronizing with the station while being synchronized with the master access point, and transmitting a request to send (RTS) frame which contains time information for a predetermined period that the near access point suspends a data frame transmission.

In a further embodiment, step c) includes broadcasting the beacon frame to the station according to the MAC protocol defined in IEEE 802.11.

In a further embodiment, step d) includes the master access point generating the beacon frame and transmitting to the near access point, the master access point generating the RTS frame, which requests the bridge frame BPDU, and transmitting to the near access point, checking whether the master access point received the BPDU from the near access point after receiving the BPDU and clear to send (CTS) frame from the near access point, and integrating the BPDU of the near access point, generating bridge information of the entire system, generating the BPDU including the bridge information, and broadcasting to the near access point.

In a further embodiment, step d) includes receiving a data frame from the near access point that receives the broadcasted BPDU, relaying the data frame to the near access point linked with the target station, and controlling a channel switching by checking periodically whether the service period has ended or not.

Additional features of the invention will be set forth in the description which follows, and in part will be apparent from the description, or may be learned by practice of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
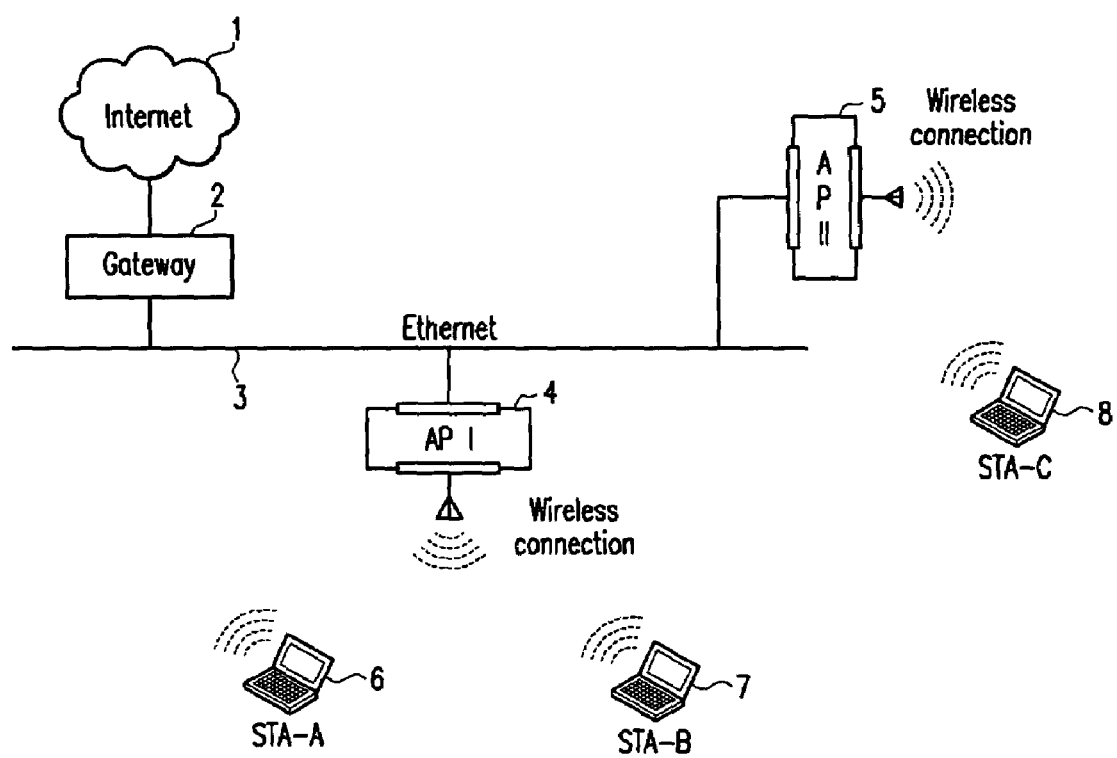
FIG. 1 is a diagram showing a general structure of a WLAN system.

In the following detailed description, exemplary embodiments of the present invention are shown and described, simply by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

In the drawings, illustrations of elements having no relation with the present invention are omitted in order to more clearly present the subject matter of the present invention. In the specification, the same or similar elements are denoted by the same reference numerals even though they are depicted in different drawings.

Exemplary embodiments of the present invention will now be described in detail with reference to the annexed drawings.

Figure 2:
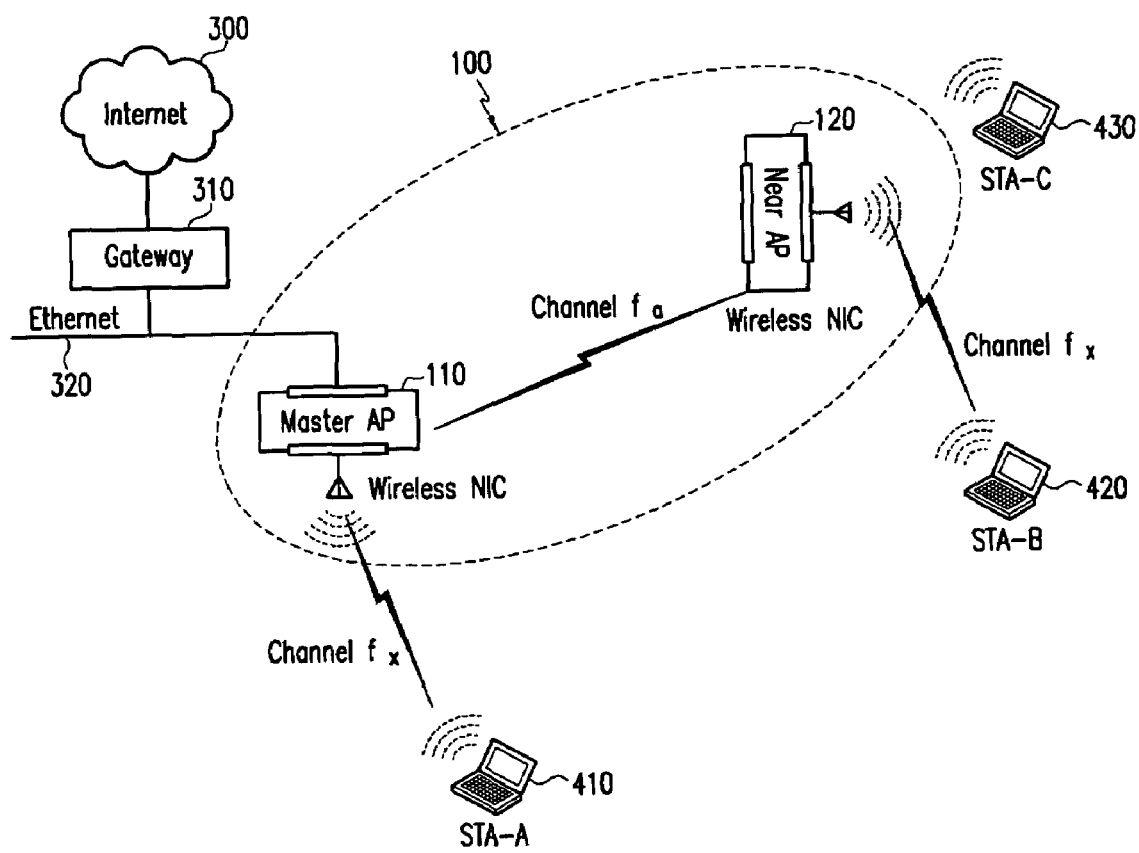
FIG. 2 is a diagram showing a frame bridge providing device in the WLAN according to an embodiment the present invention.

FIG. 2 is a diagram showing a frame bridge providing device in the WLAN according to the embodiment of the present invention.

As shown in FIG. 2, a frame bridge providing device 100 includes a master access point 110 and at least one near access point 120 near the master access point 110.

The master access point 110 is connected to the wired Internet 300 through a gateway 310 and a wired link 320 (Ethernet), and simultaneously connected to the near access point 120, which operates its own wireless basic service set (BSS), through a radio channel fa.

The master access point 110 and the near access point 120 are connected to stations 410, 420, and 430 respectively through a radio channel fx.

As to the above-structured frame bridge providing device 100, a WLAN operator assigns state information and identity numbers of respective access points, and then assigns fixed channel frequencies fa and fx for the respective access points 110 and 120.

According to the distributed coordination function (DCF) protocol defined in the MAC standard of IEEE 802.11, the master access point 110 and the near access point 120 alternately use the radio channel fx used in the wireless BSS and the radio channel fa assigned for the frame bridge between the access points regularly. By this manner, the frame bridge service between the access points is provided to the station which forms the WLAN (wireless local area network).

Basically, a wireless station supporting the DCF protocol starts transmitting a frame when it is estimated that the wireless medium is empty. But, in the case that at least one wireless station starts transmitting frames to the same wireless medium simultaneously, there occurs a collision.

Therefore, the DCF protocol is a carrier sensing multiple access/collision avoidance method which can reduce probability of collision. The exemplary embodiment provides the frame bridge according to the DCF protocol.

After providing the frame bridge to the near access point 120 using a wireless network interface card (NIC), the master access point 110 operates its own wireless BSS by changing a radio channel.

The master access point 110 functions as a bridge which transmits the frame through the near access point 120 connected by the radio channel fa to stations 420 and 430 which are not directly radio connected with the master access point 110.

In another case, the master access point 110 provides the frame bridge to the near access point 120 by changing the channel to fa after providing the frame bridge to the station 410 through the radio channel fx.

The exemplary embodiment of the present invention enables frame transmission through a radio channel (link) of more than one hop to diversify the WLAN structure which is limited within a connected network, and improve the quality of transmission service to the station.

Herein, the frame bridge providing device will be described in detail.

Figure 3:
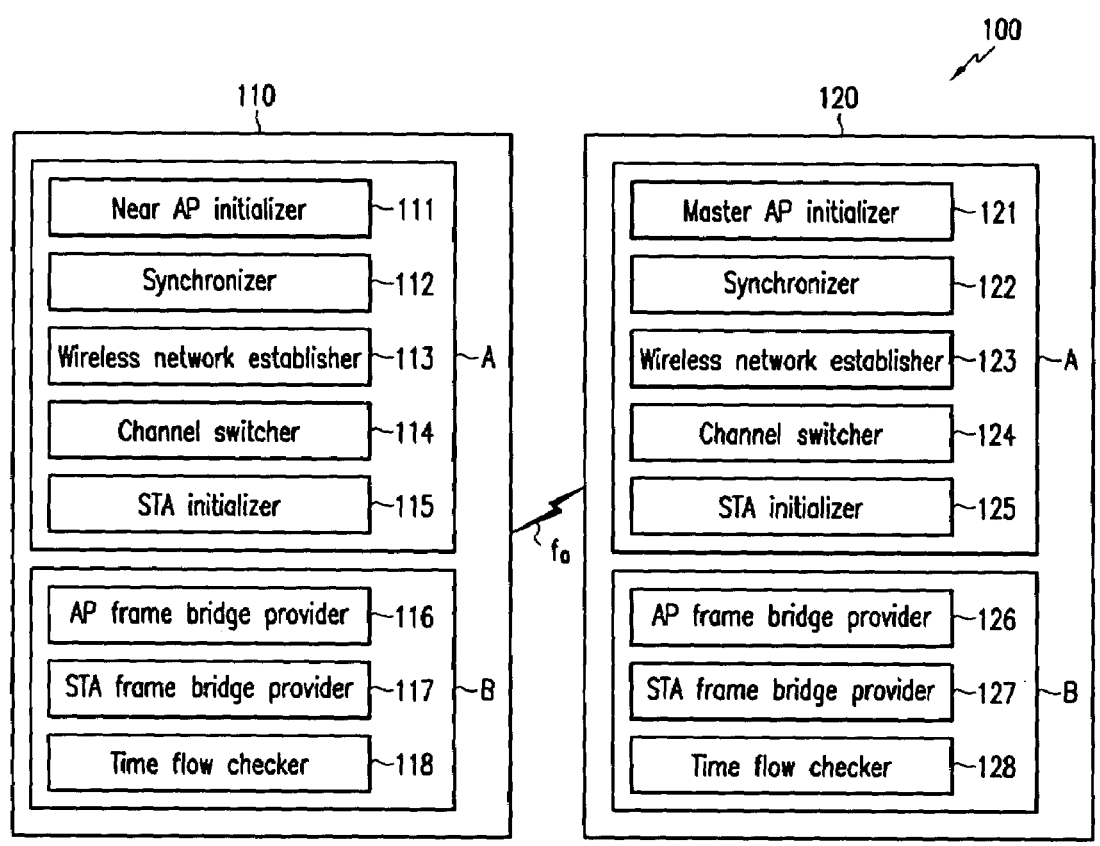
FIG. 3 is a diagram showing a detailed block diagram of the frame bridge providing device shown in FIG. 2.

FIG. 3 is a diagram showing a detailed block diagram of the frame bridge providing device shown in FIG. 2.

As shown in FIG. 3, the master access point 110 and the near access point 120 of the frame bridge providing device 100 include an initializer A and frame bridge provider B respectively.

The initializer A of the master access point 110 includes a near access point (AP) initializer 111, a synchronizer 112, a wireless network establisher 113, a channel switcher 114, and a station (STA) initializer 115.

The frame bridge provider B of the master access point 110 includes an AP frame bridge provider 116, a STA frame bridge provider 117, and a time flow checker 118.

The initializer A of the near access point 120 includes a master access point initializer 121, a synchronizer 122, a wireless network establisher 123, a channel switcher 124, and an STA initializer 125.

The frame bridge provider B includes an access point frame bridge provider 126, and STA frame bridge provider 127, and a time flow checker 128.

In detail, the near AP initializer 111 of the master access point 110 obtains information (e.g., identity number) from a probe request frame that is received from the near access point 120, and selects the master access point and the near access point that are to operate the wireless network.

Once the access point is selected as a master access point, the near AP initializer 111 of the selected master access point 110 records access point information which is in the probe request frame received from the near access point 120.

When channel searching by the near AP initializer 111 is finished, the synchronizer 112 transmits a beacon frame (beacon message) to the near access point 120 through the radio channel fa, so that the synchronizer 112 may control the near access point 120 to read information in the beacon frame and be synchronized with the master access point 110 through time information such as delivery traffic indication message (DTIM), traffic indication map (TIM), TIM interval and the channel.

The wireless network establisher 113 transmits an association response frame to the synchronized near access point 120 for an association request frame received from the synchronized near access point 120, and the wireless network establisher 113 controls the near access point to establish a connection for the radio channel fa.

The wireless network establisher 113 establishes a connection for the radio channel fa to configure a wireless connection between access points (named as 'access point-BSS').

The channel switcher 114 switches the radio channel to fx for the wireless connection with the station 410 after wirelessly connecting with the near access point 120. The channel switcher 114 switches the radio channel to fa for providing the frame bridge to the near access point 120 when the wireless connection with the station 410 is finished.

In the above process, the channel switcher 114 switches to a new channel when recording and processing information of the present connected radio channel.

The STA initializer 115 broadcasts the beacon frame to the station according to the MAC protocol defined in IEEE 802.11, and establishes a wireless connection with the station which receives the beacon frame.

The AP frame bridge provider 116 of the master access point 110 receives a Bridge Protocol Data Unit (BPDU), which contains bridge information of the near access point 120, from each near access point, and the AP frame bridge provider 116 generates and stores bridge information of the wireless distribution system (e.g., a MAC address of the access point, and a table including MAC addresses of the station connected wirelessly).

Thereafter, the AP frame bridge provider 116 broadcasts the BPDU, including bridge information of the wireless distribution system, to the near access point 120, and transmits a data frame to the predetermined near access point among near access points that received the BPDU.

The STA frame bridge provider 117 provides the frame bridge to the corresponding station according to the DCF defined in the MAC standard of IEEE 802.11.

The time flow checker 118 checks at any time whether the present time belongs to a period of the initialization of the near access point 120, a period of the initialization of the station in the wireless BSS, a period of providing the frame bridge to the near access point 120, or a period of providing the frame bridge to the station, and the time flow checker 118 accordingly switches the radio channel.

Each component 121 to 128 of the near access point 120 performs the same process as that of each component 111 to 118 of the master access point.

An operation process of the frame bridge providing device will be described in detail.

Figure 4:
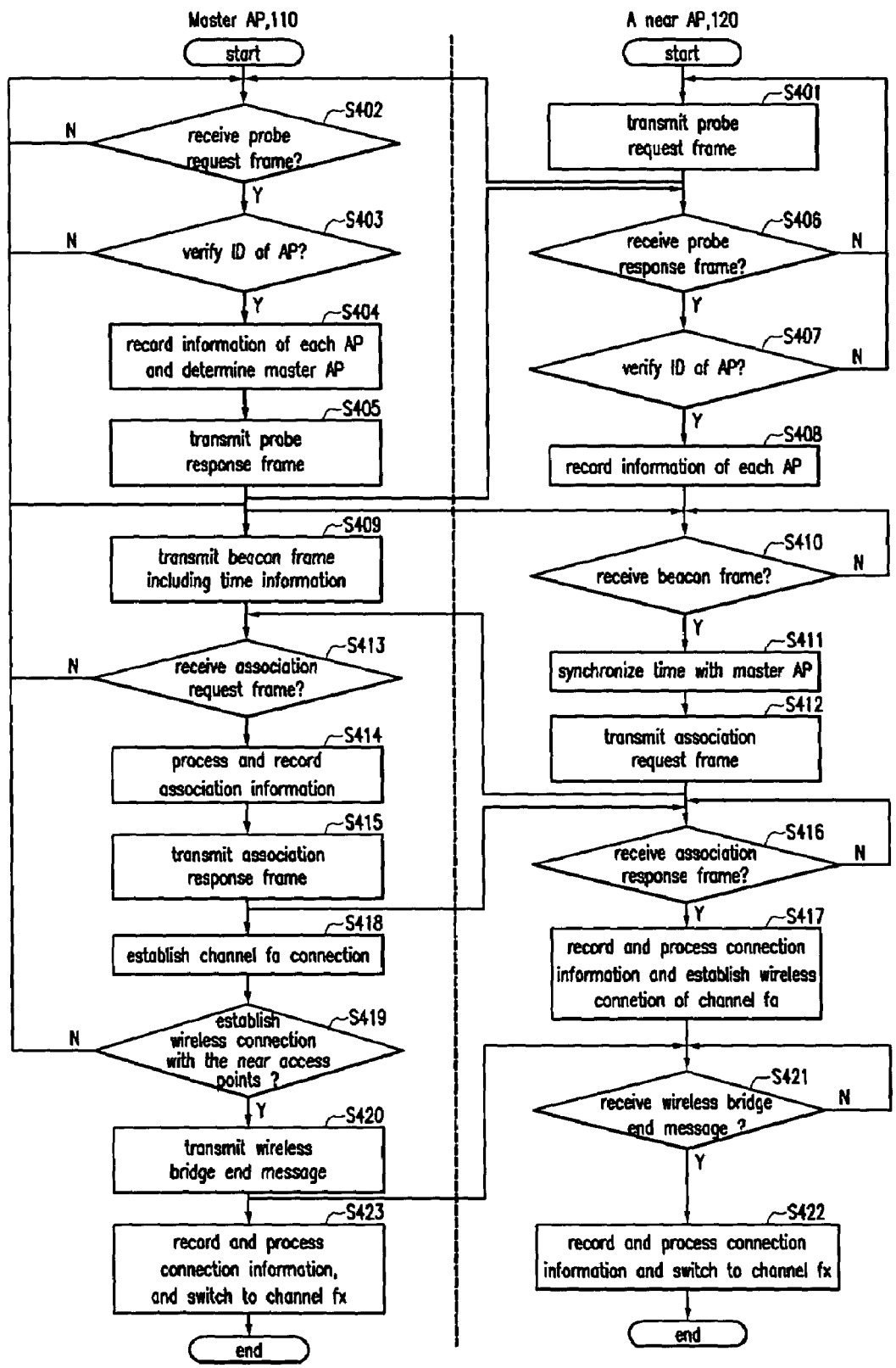
FIG. 4 is a flowchart sequentially showing an operation process of the frame bridge providing device shown in FIG. 3 (AP initialization).

FIG. 4 is a flowchart sequentially showing an operation process of the frame bridge providing device shown in FIG. 3 (AP initialization).

According to a power control or an operational control by the WLAN operator, the near access point 120 transmits a probe request frame for obtaining information of the master access point 110 in step S401, and the master access point 110 receives the probe request frame from the near access point 120 in step S402.

The master access point 110 verifies an identity number (ID) of the access point recorded in the probe request frame in step S403, determines the master access point and the near access point for an operation of the wireless network with a near access point, and records information of the access point recorded in the probe request frame in step S404.

The master access point 110 transmits the probe response frame including the determined information to the near access point 120 in step S405.

The near access point 120 receives the probe request frame from the master access point 110 in step S406, and also verifies the ID of the access point recorded in the probe response frame in step S407. Then the near access point 120 determines the master access point and the near access point for an operation of the wireless network, and records information of the access point recorded in the probe response frame in step S408.

After the above mentioned searching process is finishes, the master access point 110 transmits the beacon frame (beacon message) to the near access point 120 through the radio channel fa in step S409.

Each near access point 120 receives the beacon frame from the master access point 110 in step S410. The near access point 120 reads the beacon frame information according to the MAC standard of IEEE 802.11, and synchronizes time information such as DTIM, TIM, TIM interval, and the channel, with the master access point in step S411. The near access point 120 transmits the association request frame including its information to the master access point 110 in step S412.

The master access point 110 receives the association request frame from the near access point 120 in step S413, processes the association request information in step S414, and transmits the association response frame to the near access point 120 in step S415.

The near access point 120 establishes a connection to the radio channel fa according to success or failure information of the association response frame and connection information in step S417 when the near access point 120 receives the association response frame in step S416.

The master access point 110, which transmits the association response frame, establishes a connection with the near access point 120 in step S418.

The master access point 110 establishes the wireless connections with the near access points according to the bridge information on the access points received through the probe frames in step S419.

Figure 5:
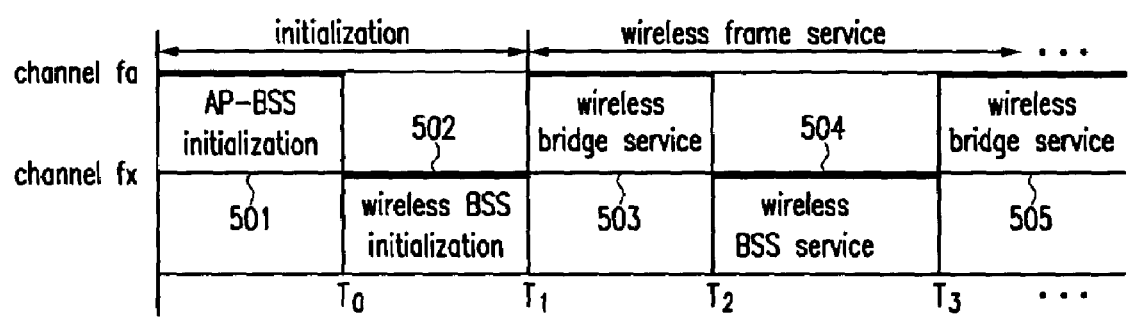
FIG. 5 is a conceptual diagram showing a frame bridge providing process time sequentially according to an embodiment of the present invention.

The master access point 110 performs the above mentioned steps during a predetermined time which is shown in FIG. 5 illustrating a time period for each step during the predetermined time.

As shown in FIG. 5, the master access point 110 finishes the AP-BSS initialization process 501 during time $T_0$. The access points 110 and 120 determine whether a connection establishment for near access points is finishes to provide a wireless BSS service to the wireless stations 410, 420, and 430 in step S419.

The master access point 110 transmits a wireless bridge end message to the near access point 120 when the connection for the near access points is finished in step S420.

The near access point 120 receives the wireless bridge end message in step S421, records connection information, establishes a Network Allocation Vector (NAV) for the wireless BSS service by using time information included in the received message, and switches a radio channel to fx in step S422.

The master access point 110 records connection information, processes time information, and switches a radio channel to fx in step S423.

The access points 110 and 120, which switched a channel to fx for an operation of the wireless BSS, broadcast a beacon frame according to the MAC standard of IEEE 802.11, and establish a connection with a wireless station that received the beacon frame.

The access points 110 and 120, which operate their independent wireless BSS run in different frequencies, and time information of each access point corresponds with that of the master access point.

In order to perform wireless communication again with other access points after the same amount of time T1 (502) has passed the access points 110 and 120 transmit a request to send (RTS) frame including time information for terminating frame transmission to the stations by time T2 (503).

The RTS frame has a MAC address of the master access point 110 as a target address. The station which received the RTS frame establishes a NAV, and terminates the transmission through the channel frequency fx.

Figure 6:
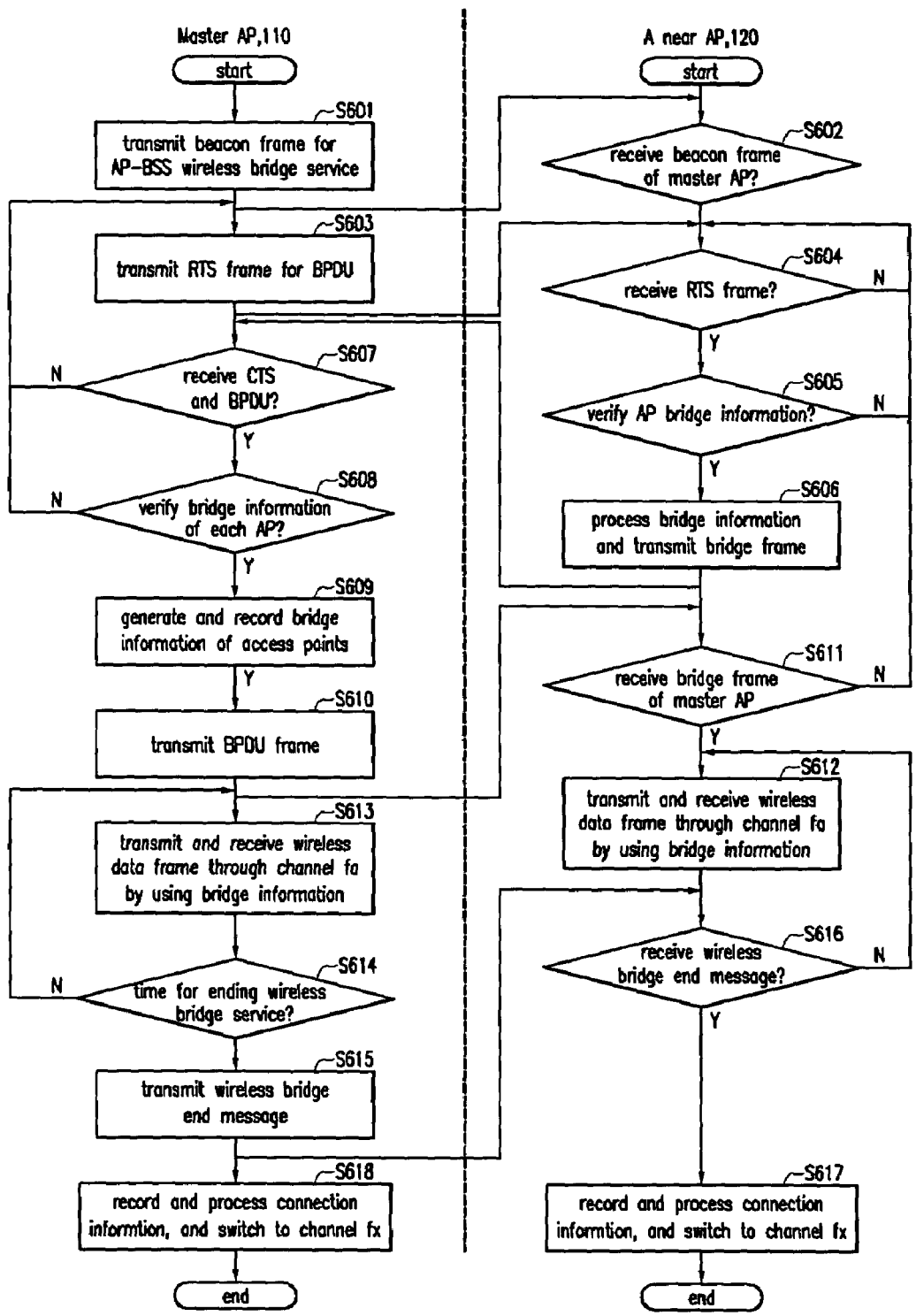
FIG. 6 is a flowchart showing an operation process of the frame bridge providing device (providing a bridge) according to an embodiment of the present invention.

FIG. 6 is a flowchart showing an operation process of the frame bridge providing device (providing a bridge) according to the exemplary embodiment of the present invention.

The master access point 110 transmits a beacon frame to the near access point 120 in step S601. The near access point 120, which has transmitted an RTS frame to stations in the WLAN, switches a channel frequency to fa and the near access point 120 receives the beacon frame in step S602 from the master access point 110, and performs synchronization with the master access point 110.

The master access point 110 transmits an RTS frame to the near access point 120 to exchange a BPDU frame defined in IEEE 802.11 in step S603.

The near access point 120 receives the RTS frame in step S604, and reads bridge information of the master access point 110 in accordance with the RTS frame in step S605 to process the bridge information of the near access point, and transmits a BPDU frame generated in the above step S605 to the master access point 110 in step S606.

The master access point 110 receives a clear to send (CTS) frame and the BPDU frame from the near access point 120 in step S607, verifies the received bridge information of the access point in step S608, and generates and records bridge information of access points in step S609.

The master access point 110 generates a BPDU frame including information of the wireless distribution system and transmits the same to access points in step S610. The near access points receive the BPDU frame from the master access point 110 in step S611, and transmit and receive a wireless frame through the radio channel fa of the AP-BSS by receiving confirmation for frame transmission request requiring a wireless bridge in step S612.

The master access point 110 also provides a wireless frame service for transmitting the frame that needs the wireless bridge among frames received from the near access points to another near access point in step S613.

After the step S613, the master access point 110 checks whether the present time is the time $T_2$ (504 in FIG. 5) for finishing the wireless bridge service in step S614, and transmits a wireless bridge end message to the near access point when the present time is the time $T_2$ in step S615.

The near access point records and processes connection information with the master access point, and switches the channel to the channel fx for the wireless BSS service in step S617, when the near access point receives the wireless bridge end message in step S616.

The master access point 110 also records and processes connection information, and switches the channel to the channel fx in step S618.

The above mentioned frame bridge providing process among the access points is operated until the time $T_2$ (504 in FIG. 5). The time periods "T1 to T2" and "T3 to T4" have the same value as the maximum value of the point coordination function (PCF) defined in IEEE 802.11 MAC standard.

The access points, which finished the wireless frame bridge, switch the channel again for the wireless BSS service, and provide the wireless BSS service to the stations according to the DCF access control method of the MAC standard in IEEE 802.11.

The apparatus and method for providing a frame bridge of a wireless local area network according to an exemplary embodiment of the present invention, provide a frame bridge through a wired link, and also provide a wireless BSS service by using a singular wireless network interface card (NIC), and a wireless bridge with neighbor access points supporting the MAC standard of IEEE 802.11.

The present invention enables frame transmission through a radio channel (link) of more than one hop, so that the present invention may diversify the WLAN structure, which is limited within a connected network, and improve the quality of frame transmission service to the station.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for providing a frame bridge in a wireless local area network (WLAN), which provides a wired network service received from a communication network through a gateway to a station, comprising:

an access point (AP) initializer establishing connections with near access points through a first radio channel when a current access point transmits and receives a probe frame including identity numbers of each access point to/from near access points, and is selected as a master access point;

a station (STA) initializer for broadcasting a beacon frame, including time information, to the station through a second radio channel and establishing a connection to the station after a frame communication with the near access point is suspended for a predetermined time;

a frame bridge provider for providing the wired network service received from the network to the station through the established second radio channel and transmitting a data frame to the near access point connected with the target station by switching a channel to the first radio channel; and a time flow checker for periodically checking whether the present time belongs to a period for a wireless connection establishment with the near access point or with the station, or a period for providing a data frame to the near access point or to the station, and controlling switching of the radio channel according to the above checking result, wherein the frame bridge provider transmits and receives a data frame to/from the near access points through the first radio channel after transmitting a Bridge Packet Data Unit (BPDU) including bridge information of near access points to the near access points, wherein the bridge information of near access points is obtained through transmitting a request to send (RTS) frame which requests the bridge frame BPDU to the near access points and receiving the bridge frame BPDU with a clear to send (CTS) frame from the near access points.

2. The apparatus for providing a frame bridge in the WLAN of claim 1, wherein the apparatus further comprises:

an AP initializer for establishing a connection with the master access point through a first radio channel when a current access point transmits and receives a probe frame including identity numbers of each access point to/from near access points, and is selected as a near access point;

an STA initializer for transmitting the beacon frame and establishing a connection with at least one station through a second radio channel;

a frame bridge provider for relaying the data frame received from the master access point to a station through the second radio channel; and a time flow checker for periodically checking whether the present time belongs to a period for a wireless connection establishment with the master access point or with the station, or a period for providing a data frame to the master access point or to the station, and controlling switching of the radio channel according to the above checking result.

3. The apparatus for providing a frame bridge in the WLAN of claim 1, wherein the AP initializer comprises:

a near AP initializer for determining a master access point and a near access point by using a probe frame received from the near access point;

a synchronizer for transmitting a beacon frame to the near access point and controlling the near access point to be synchronized with the master access point, the near access point synchronizing with a target station while being synchronized with the master access point; and a wireless network establisher for establishing a connection with the near access point through the first radio channel when the synchronized near access point establishes the connection for the first radio channel.

4. The apparatus for providing a frame bridge in the WLAN of claim 3, wherein the near access point synchronizes with the master access point by using at least one of delivery traffic indication message (DTIM), traffic indication map (TIM), and TIM interval in the beacon frame.

5. The apparatus for providing a frame bridge in the WLAN of claim 1, wherein the STA initializer broadcasts the beacon frame to a station according to the MAC (Media Access Control) protocol defined in IEEE 802.11.

6. A method for providing a frame bridge in the WLAN, which provides a station with wired network service received from the network through a gateway, comprising:

a) transmitting and receiving a probe frame including identity numbers of each access point to/from more than one near access point and determining a master access point and a near access point respectively;

b) establishing a connection with a near access point through a first radio channel after controlling the master access point to transmit a beacon frame including time information to the near access point through the first radio channel and to be synchronized with the near access point;

c) the near access point broadcasting a beacon frame to a station through a second radio channel and establishing a connection with the station after the end of the connection establishment with the master access point, the near access point synchronizing with the station while being synchronized with the master access point;

d) the master access point relaying a data frame to the near access point linked with a target station after the master access point switches the connection to the first radio channel and broadcasts a Bridge Packet Data Unit (BPDU) including bridge information of the near access points;

e) the near access point transmitting a beacon frame to the station and being synchronized with the master access point after switching the connection to the second radio channel, wherein the bridge information of near access points, including the BPDU, is obtained through transmitting a request to send (RTS) frame which requests the bridge frame BPDU to the near access points and receiving the bridge frame BPDU with a clear to send (CTS) frame from the near access points.

7. The method for providing a frame bridge in the WLAN of claim 6, wherein the method further comprises: f) checking periodically whether the present time belongs to a period for a wireless connection establishment with the near access point or with the station, or a period for providing a data frame to the near access point or to the station, and controlling radio channel switching according to the above checking result.

8. The method for providing a frame bridge in the WLAN of claim 7, wherein b) comprises:

checking whether connection establishment with the near access points is finished; and transmitting a wireless bridge end message to the near access points when the above connection establishment is finished.

9. The method for providing a frame bridge in the WLAN of claim 8, wherein c) comprises:

transmitting a request to send (RTS) frame which contains time information for a predetermined period in which the near access point suspends a data frame transmission.

10. The method for providing a frame bridge in the WLAN of claim 9, wherein c) comprises: broadcasting the beacon frame to the station according to the MAC protocol defined in IEEE 802.11.

11. The method for providing a frame bridge in the WLAN of claim 10, wherein d) comprises:

the master access point generating the beacon frame and transmitting the beacon frame to the near access point;

the master access point generating the RTS frame which requests the bridge frame BPDU and transmitting the RTS frame to the near access point;

checking whether the master access point received the BPDU from the near access points after receiving the BPDU and a clear to send (CTS) frame from the near access point; and integrating the BPDU of the near access points, generating bridge information of the system, generating the BPDU including the bridge information, and broadcasting the BPDU to the near access point.

12. The method for providing a frame bridge in the WLAN of claim 11, wherein d) comprises:

receiving a data frame from the near access point which receives the broadcasted BPDU;

relaying the data frame to the near access point linked with the target station; and controlling a channel switching by checking periodically whether a service period is ended or not.

\* \* \* \* \*